US010057177B2

United States Patent
Saha et al.

(10) Patent No.: US 10,057,177 B2
(45) Date of Patent: Aug. 21, 2018

(54) SERVICE OFFLOADING IN COMMUNICATIONS (71) Applicant: NOKIA SOLUTIONS AND NETWORKS OY, Espoo (FI)

(72) Inventors: Sumanta Saha, Espoo (FI); Erkki Juhani Hietala, Espoo (FI); Jani Olavi Söderlund, Vantaa (FI); Niko Markus Savolainen, Kerava (FI); Tommy Johannes Lindgren, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 32 days.

(21) Appl. No.: 15/114,995

(22) PCT Filed: Feb. 5, 2014

(86) PCT No.: PCT/EP2014/052202
§ 371 (c)(1),
(2) Date: Jul. 28, 2016

(87) PCT Pub. No.: WO2015/117642
PCT Pub. Date: Aug. 13, 2015

(65) Prior Publication Data
US 2016/0344637 A1 Nov. 24, 2016

(51) Int. Cl.
H04L 12/859 (2013.01)
H04L 29/06 (2006.01)
H04L 12/851 (2013.01)
H04L 12/801 (2013.01)
H04W 88/16 (2009.01)

(52) U.S. Cl.
CPC .......... H04L 47/2441 (2013.01); H04L 47/10 (2013.01); H04L 47/2483 (2013.01); H04L 69/22 (2013.01); H04W 88/16 (2013.01)

(58) Field of Classification Search
None
See application file for complete search history.

(56) References Cited

U.S. PATENT DOCUMENTS 9,160,761 B2 * 10/2015 Lee ..................... H04L 63/1433
9,252,972 B1 * 2/2016 Dukes .................. H04L 12/569
2013/0163427 A1 6/2013 Beliveau et al.
2013/0195457 A1 8/2013 Levy et al.
(Continued)

OTHER PUBLICATIONS

International Search Report & Written Opinion dated Oct. 10, 2014 corresponding to International Patent Application No. PCT/EP2014/052202.
(Continued)

Primary Examiner — Duc T Duong
(74) Attorney, Agent, or Firm — Squire Patton Boggs (US) LLP (57) ABSTRACT A method is disclosed for service offloading in a communications system, the method comprising determining, in a network apparatus, whether a traffic flow has been properly classified by a deep packet inspection virtual machine. If the traffic flow has been properly classified by the deep packet inspection virtual machine, the method comprises instructing a software defined networking controller to stop sending further packets of said traffic flow to the deep packet inspection virtual machine.

10 Claims, 6 Drawing Sheets (56) References Cited

U.S. PATENT DOCUMENTS

| | | | | |
|---|---|---|---|---|
| 2013/0332983 A1* | 12/2013 | Koorevaar | ............... | H04L 63/20 |
| | | | | 726/1 |
| 2014/0201374 A1* | 7/2014 | Ashwood-Smith | ..... | H04L 49/70 |
| | | | | 709/226 |
| 2014/0233385 A1* | 8/2014 | Beliveau | ................ | H04L 47/122 |
| | | | | 370/235 |
| 2014/0334295 A1* | 11/2014 | Guichard | ............. | H04L 47/2475 |
| | | | | 370/230 |
| 2015/0156086 A1* | 6/2015 | Chesla | ..................... | H04L 43/04 |
| | | | | 709/224 |
| 2017/0149632 A1* | 5/2017 | Saltsidis | ............. | H04L 41/5054 |

OTHER PUBLICATIONS

Li Erran Li et al., "Toward Software-Defined Cellular Networks," 2012 European Workshop on Software Defined Networking (EWSDN), IEEE, Oct. 25, 2012, pp. 7-12, XP032283462.

\* cited by examiner

SERVICE OFFLOADING IN COMMUNICATIONS

FIELD OF THE INVENTION

The exemplary and non-limiting embodiments of this invention relate generally to wireless communications networks, and more particularly to service offloading.

BACKGROUND ART

The following description of background art may include insights, discoveries, understandings or disclosures, or associations together with dis-closures not known to the relevant art prior to the present invention but provided by the invention. Some such contributions of the invention may be specifically pointed out below, whereas other such contributions of the invention will be apparent from their context.

Network functions virtualization (NFV) is a design approach for building complex applications e.g. in the telecommunications and service provider industries. NFV virtualizes network functions into building blocks that may be connected, i.e. chained together to create services. A virtualized network function (VNF), may comprise one or more virtual machines (VM) running various software and processes. The same virtualized platform that supports provisioning machines into VNFs, may also support programming virtualized network devices and flows to support VNFs. The programming of virtualized network devices and flows to support VNFs is the domain of software defined networking (SDN).

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Various aspects of the invention comprise a method, apparatuses, and a computer program product as defined in the independent claims. Further embodiments of the invention are disclosed in the dependent claims.

An aspect of the invention relates to a method for service offloading in a communications system, the method comprising determining, in a network apparatus, whether a traffic flow has been properly classified by a deep packet inspection virtual machine; wherein if the traffic flow has been properly classified by the deep packet inspection virtual machine, the method comprises instructing a software defined networking controller to stop sending further packets of said traffic flow to the deep packet inspection virtual machine.

A further aspect of the invention relates to an apparatus comprising at least one processor; and at least one memory including a computer program code, wherein the at least one memory and the computer program code are configured to, with the at least one processor, cause the apparatus to perform any of the method steps.

A still further aspect of the invention relates to an apparatus comprising at least one processor; and at least one memory including a computer program code, wherein the at least one memory and the computer program code are configured to, with the at least one processor, cause the apparatus to disable a deep packet inspection service for a traffic flow, based on instructions received from a packet data gateway, if said instructions instruct the apparatus to stop sending further packets of said traffic flow to a deep packet inspection virtual machine; enable the deep packet inspection service for the traffic flow, based on the instructions received from the packet data gateway, if said instructions instruct the apparatus to start sending further packets of said traffic flow to the deep packet inspection virtual machine.

A still further aspect of the invention relates to a computer program product comprising executable code that when executed, causes execution of functions of the method.

Although the various aspects, embodiments and features of the invention are recited independently, it should be appreciated that all combinations of the various aspects, embodiments and features of the invention are possible and within the scope of the present invention as claimed.

BRIEF DESCRIPTION OF THE DRAWINGS

In the following the invention will be described in greater detail by means of exemplary embodiments with reference to the attached drawings, in which.

DETAILED DESCRIPTION OF SOME EMBODIMENTS

Recent developments in mobile infrastructure technology have radically changed the view of the network from traditional silo-hardware based black box elements to more open generic-hardware based systems where logically separate network functions are also physically separate and connected with well-known interfaces. Such developments are also being standardized under the supervision of ETSI in the name of NFV (network functions virtualization).

Figure 1:
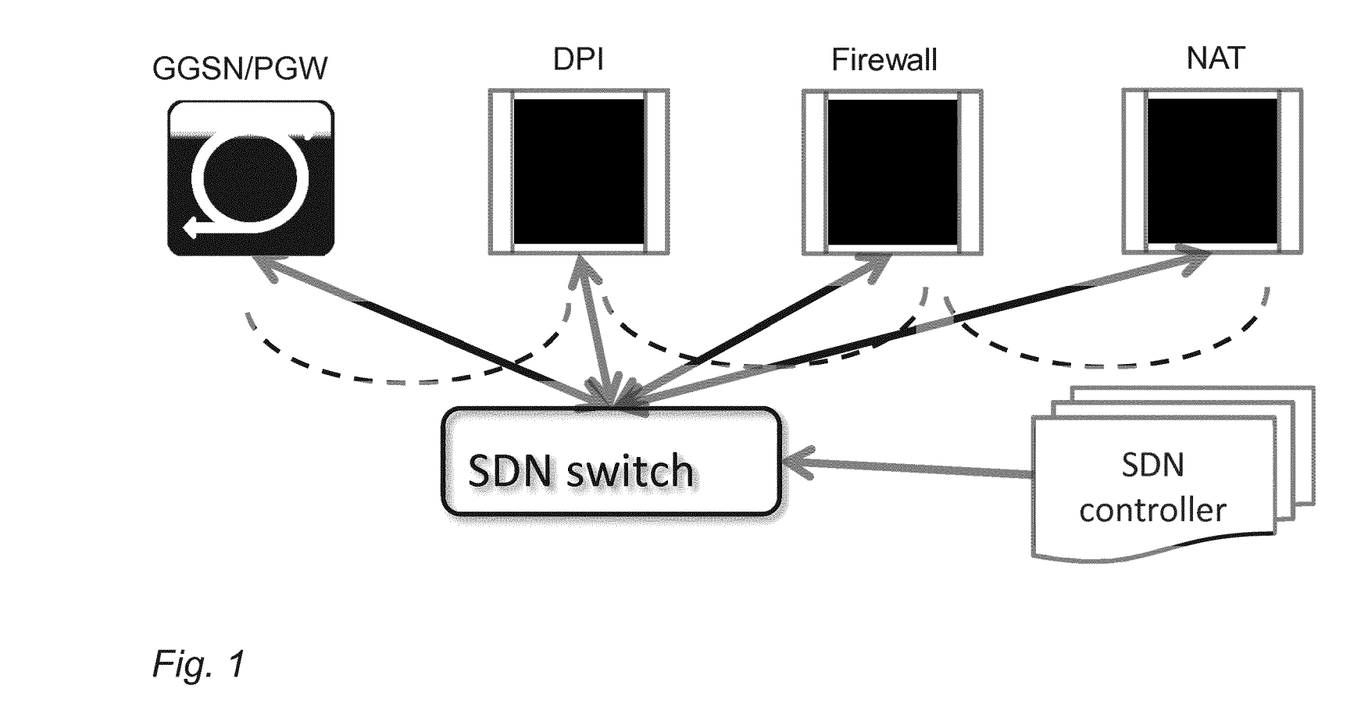
FIG. 1 illustrates prior art service chaining with SDN.

An important part of NFV is service chaining (see FIG. 1 illustrating prior art service chaining with software defined networking (SDN)) where necessary add-on services such as deep packet inspection (DPI), firewall, network address translation (NAT) etc. are chained together on demand for a particular bearer. In this way, there are no hardwired flows of network functions for a particular bearer; rather the flow is defined on the fly based on need coming from different AAA servers and operator configuration. For example, a particular traffic flow of a bearer may be charged differently if that flow is of a certain application (such as torrent etc.). This differential charging requires the use of DPI to detect an application type. This need then triggers the chaining of a DPI service to a bearer data flow, and the user plane packet for this bearer goes through the DPI service in the service chain.

In a future vision of NFV, these services are realized using virtualization, and chaining virtual machines (VM) on demand to a packet path of user plane data. The packets flow from VM to VM receiving services as chained by central control and routed using technologies such as the software defined networking (SDN).

Although running on virtual machines (VM), aforementioned services require physical resources, and the more packets they need to process the more resource demanding they get. For processing intensive services such as deep packet inspection (DPI), the demand for resources is even higher. While dimensioning a telecom system, operators need to take into account this demand and allocate enough resources.

In an optimal system, passing of packets from VM to VM should be minimized to bring down the overall resource usage. Minimizing packet passing results in less load on the service such as DPI, less load on the packet transport system such as SDN, less pressure on the available physical resources, etc.

Current DPI engines, such as OpenDPI or DPI engines from commercial DPI SDKs, require by default that the DPI engine receives each packet of a flow to classify the flow and returns the result back to the application that is using the DPI service. In this case, the DPI engine is processing each and every packet of the traffic flow even after the flow has been classified completely.

Regarding the DPI engines, usually only the first few packets of a flow are required, in order to classify the flow as belonging to a certain application or web service. After the classification is complete, further DPI processing of the packets of that flow is not necessary. Thus, it might be possible to offload the DPI engine by not sending packets to it after a valid classification is done. However, multiple HTTP requests may be sent over one TCP flow, and multiple TCP flows may be used by the traffic of one particular application. These intricacies make the decision of when to send packets again to the DPI engine difficult. Without knowing the perfect time to end the offloading and start sending packets back to the DPI engine, there stays a possibility to miss packets important for the classification.

Figure 2:
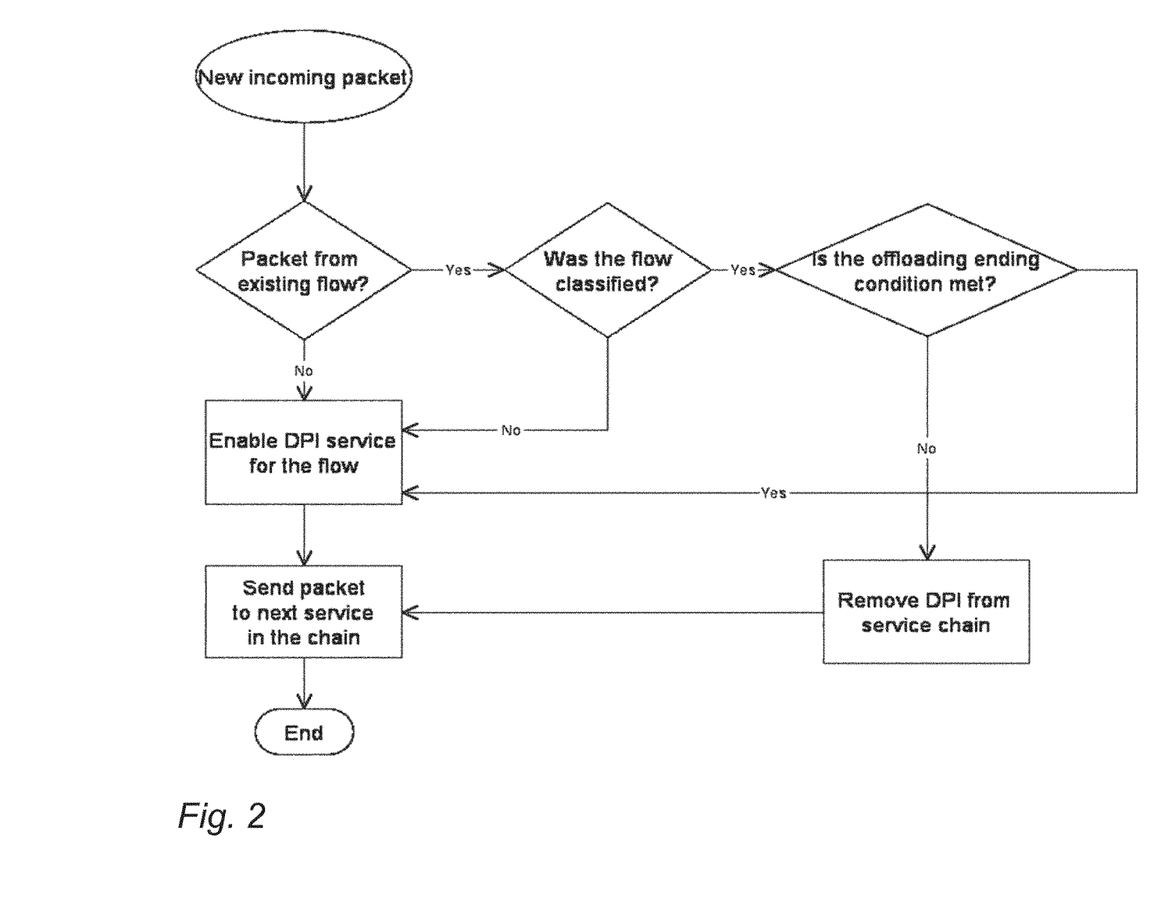
FIG. 2 illustrates DPI service offloading in a NFV service chain.

An exemplary embodiment relates to service offloading in a SDN switched NFV environment. An exemplary embodiment discloses intelligently determining and offloading as many data packets as possible from the DPI network function (or other similar services) using SDN, and thus minimizing resource pressure. An exemplary intelligence that runs in PGW determines when a particular traffic flow (classified by 5 tuple) has been classified properly by the DPI engine, and instructs the SDN controller to offload further packets from the same flow. An exemplary embodiment also determines the time when there may be a change in the offloaded flow (such as a change of URI or host name) and instructs the SDN controller to start sending packets to the DPI engine again. This is depicted in FIG. 2 illustrating DPI service offloading in a NFV service chain.

Figure 3:
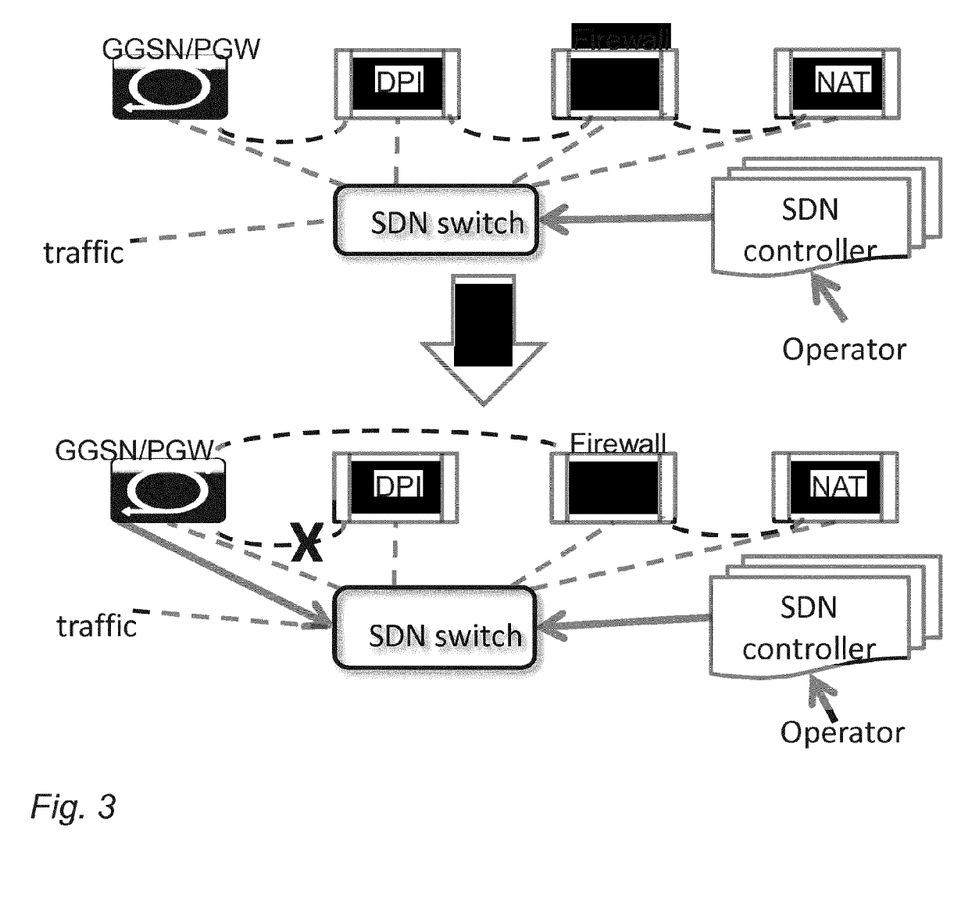
FIG. 3 illustrates dynamic SDN programming by PGW for chaining modification.

An exemplary embodiment uses SDN to steer the traffic based on decisions made within the network gateway, and changes the chaining in such a dynamic way that packets do not traverse an extra service hop when not necessary. Thus, by means of an exemplary embodiment, it is possible to change the use of SDN service chaining from a fixed operator configured way to a dynamic network element instructed way which enables automatic service chaining allowing dynamic offloading of the traffic. FIG. 3 shows a simple depiction where PGW programs the SDN controller to skip the DPI service in the chain for the subsequent traffic. Similarly, PGW may anytime later enable DPI again based on PGW's internal knowledge about the traffic. The use of SDN in such a solution provides flexibility to monitor and change the nature of such offloading on the fly.

The effect of an exemplary embodiment may be clearly seen on a cloudified gateway environment by checking the load of the DPI network function before and after the optimization algorithm is enabled. An exemplary embodiment is also a direct contributor on the number of VMs spawned for DPI network function. As the number of packets passing through the DPI service is less when offloading is enabled, so the need to spawn new VMs is also smaller, saving the resource costs directly.

In a NFV service chain controlled by SDN switching, packets pass from one service to another on demand. The chains are created and maintained dynamically using SDN commands, making it possible to change the chain on the fly and disable some service from the packet path. This may be referred to as offloading herein.

In case of a DPI service, the operator usually wants to know the classification of a traffic flow based on whether it belongs to some particular web service or application, etc. Depending on that information, some actions are applied on the flows (e.g. charging, gating, etc). Usually, the classification of the flow is already done in the first few packets. Thus, forwarding subsequent packets to the DPI service is unnecessary. However, it is also important not to miss any information in the flow which might change the classification process (such as a new URI).

Figure 4:
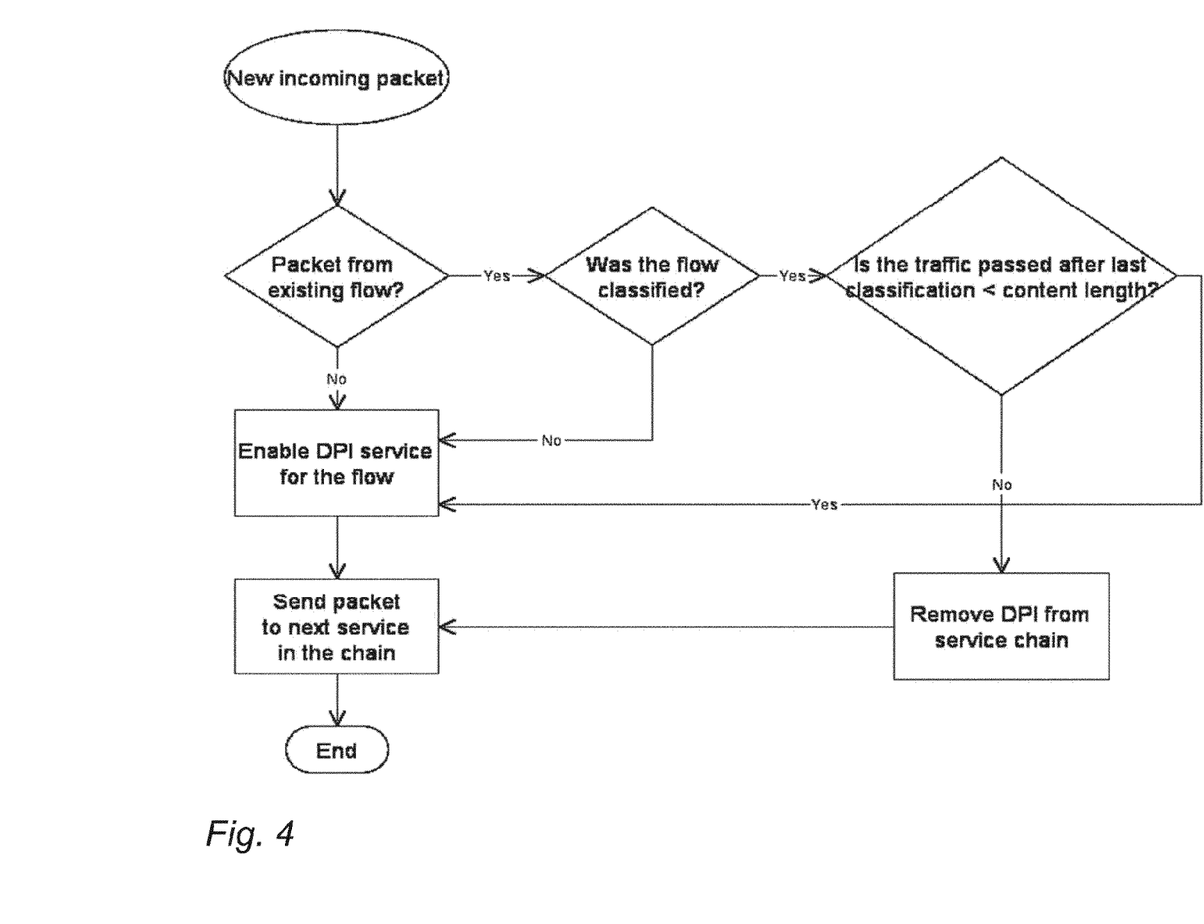
FIG. 4 illustrates DPI offload based on content length.

In an exemplary embodiment, each new flow is forwarded to the DPI service by programming the SDN switch, and the packets are returned back along with a custom header specifying the classification result. If the classification field contains a valid application, the chain to DPI VM is torn from the SDN switch and the classification result is used for each subsequent packet of the flow. To keep track on how long offloading the packets from DPI may be continued, different solutions may be resorted to for different applications. For example, for HTTP transactions, the system may keep track of the content length of the resource being transferred to the client, and use that to understand how many packets it takes to finish transferring. Upon completion, the offloading is disabled, and subsequent packets of that flow are again sent to the DPI service through the SDN switch. And then the loop continues. This exemplary implementation flow is depicted in FIG. 4.

Thus the load on the DPI service may be reduced significantly, making resource planning easier. The load on the SDN switch is reduced, making switching faster. The SDN switch sees fewer packets, as one loop is missing (not sending each packet DPI and then back to GW before forwarding further out of the system). The delay on packet processing is reduced, creating less jitter.

Exemplary embodiments of the present invention will now be de-scribed more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

The present invention is applicable to any user terminal, server, corresponding component, and/or to any communication system or any combination of different communication systems that support service chaining with SDN. The communication system may be a fixed communication system or a wireless communication system or a communication system utilizing both fixed networks and wireless networks. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiment.

In the following, different embodiments will be described using, as an example of a system architecture whereto the embodiments may be applied, an architecture based on LTE-A network elements, without restricting the embodiment to such an architecture, however. The embodiments described in these examples are not limited to the LTE-A systems but can also be implemented in other network systems, such as UMTS (universal mobile telecommunications system), LTE, LTE-A, GSM, EDGE, WCDMA, Bluetooth network, WLAN or other fixed, mobile or wireless network. In an embodiment, the presented solution may be applied between elements belonging to different but compatible systems such as LAN, WLAN, LTE, LTE-A and UMTS.

Figure 5:
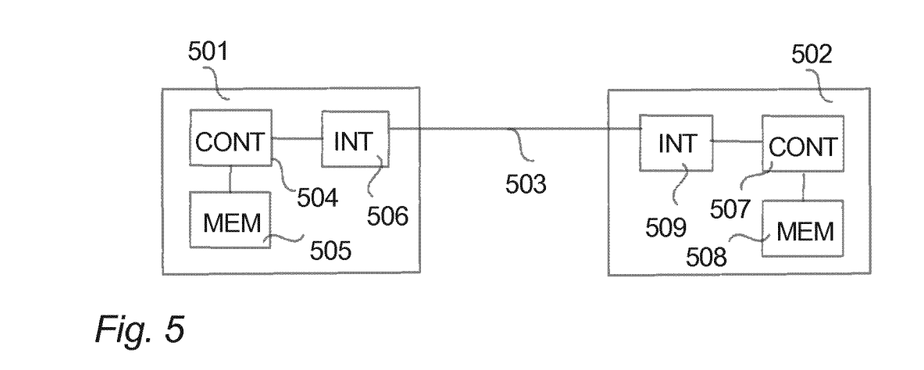
FIG. 5 shows a simplified block diagram illustrating exemplary apparatuses.

A general architecture of a communication system is illustrated in FIG. 5. FIG. 5 is a simplified system architecture only showing some elements and functional entities, all being logical units whose implementation may differ from what is shown. The connections shown in FIG. 5 are logical connections; the actual physical connections may be different. It is apparent to a person skilled in the art that the systems also comprise other functions and structures. It should be appreciated that the functions, structures, elements and the protocols used in or for service chaining, are irrelevant to the actual invention. Therefore, they need not to be discussed in more detail here.

The exemplary network system of FIG. 5 comprises a network element or node 501 of a network service provider. The network element 501 may include e.g. a packet data gateway PGW, or any other network element, or a combination of network elements, or a component/subset of a network element. The network node 501 may be connected to one or more core network (CN) elements (not shown in FIG. 5) such as a mobile switching centre (MSC), MSC server (MSS), serving gateway (SGW), mobility management entity (MME), gateway GPRS support node (GGSN), serving GPRS support node (SGSN), home location register (HLR), home subscriber server (HSS), visitor location register (VLR), network management system (NMS), a related mediator element, or to one or more radio network elements (not shown in FIG. 5) such as a base station (of e.g. LTE/LTE-A, 3G/HPSA, 2G or WLAN), to a radio network controller (e.g. 3G RNC, 2G BSC, or WLAN controller), or to a combination of network elements. FIG. 5 shows an SDN controller 502 connected to the packet data gateway 501 via a connection 503.

The packet data gateway PGW 501 comprises a controller 504 operationally connected to a memory 505. The controller 504 controls the operation of the packet data gateway PGW 501. The memory 505 is configured to store software and data. The packet data gateway PGW 501 may comprise a transceiver (not shown). The transceiver may be configured to set up and maintain a wireless connection (not shown) to a user equipment (UE). The transceiver may be operationally connected to an antenna arrangement (not shown). The antenna arrangement may comprise a set of antennas. The number of antennas may be two to four, for example. The number of antennas is not limited to any particular number. The packet data gateway PGW 501 may be operationally connected (directly or indirectly) to another network element or to another component/subset of a network element of the communication system, such as an SDN controller 502, via an interface 506.

The SDN controller 502 comprises a controller 507 operationally connected to a memory 508. The controller 507 controls the operation of the SDN controller 502. The memory 508 is configured to store software and data. The SDN controller 502 may comprise a transceiver (not shown). The transceiver may be configured to set up and maintain a wireless connection (not shown) to a user equipment (UE). The transceiver may be operationally connected to an antenna arrangement (not shown). The antenna arrangement may comprise a set of antennas. The number of antennas may be two to four, for example. The number of antennas is not limited to any particular number. The SDN controller 502 may be operationally connected (directly or indirectly) to another network element or to another component/subset of a network element of the communication system, such as the packet data gateway 501, via an interface 509.

The embodiments are not, however, restricted to the network given above as an example, but a person skilled in the art may apply the solution to other communication networks provided with the necessary properties. For example, the connections between different network elements may be realized with internet protocol (IP) connections.

Although the apparatus 501, 502 has been depicted as one entity, different modules and memory may be implemented in one or more physical or logical entities. The apparatus may also be a user terminal which is a piece of equipment or a device that associates, or is arranged to associate, the user terminal and its user with a subscription and allows a user to interact with a communications system. The user terminal presents information to the user and allows the user to input information. In other words, the user terminal may be any terminal capable of receiving information from and/or transmitting information to the network, connectable to the network wirelessly or via a fixed connection. Examples of the user terminals include a personal computer, a game console, a laptop (a notebook), a personal digital assistant, a mobile station (mobile phone), a smart phone, and a line telephone.

The apparatus 501, 502 may generally include a processor, controller, control unit or the like connected to a memory and to various inter-faces of the apparatus. Generally the processor is a central processing unit, but the processor may be an additional operation processor. The processor may comprise a computer processor, application-specific integrated circuit (ASIC), field-programmable gate array (FPGA), and/or other hardware components that have been programmed in such a way to carry out one or more functions of an embodiment.

The memory 505, 508 may include volatile and/or non-volatile memory and typically stores content, data, or the like. For example, the memory 505, 508 may store computer program code such as software applications (for example for the detector unit and/or for the adjuster unit) or operating systems, information, data, content, or the like for a processor to perform steps associated with operation of the apparatus in accordance with embodiments. The memory may be, for example, random access memory (RAM), a hard drive, or other fixed data memory or storage device. Further, the memory, or part of it, may be removable memory detachably connected to the apparatus.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g. procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

Figure 6:
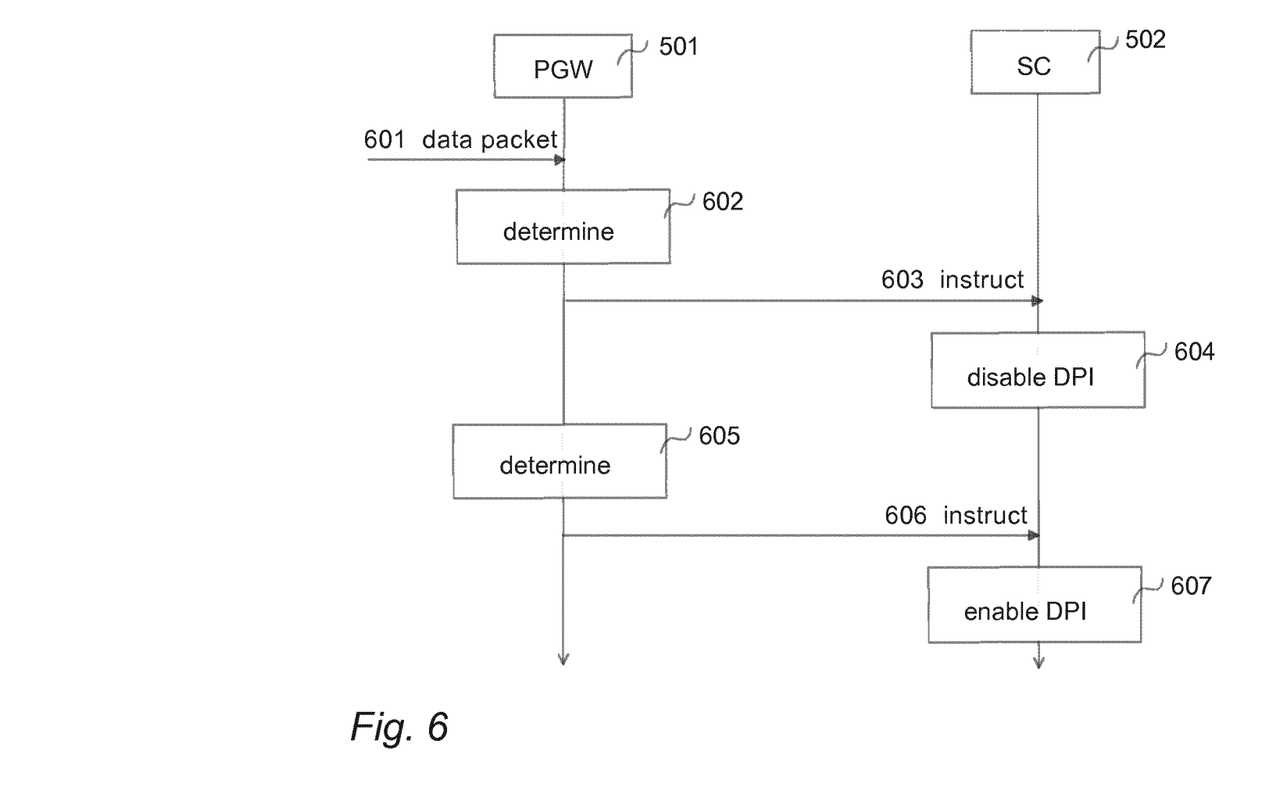
FIG. 6 shows a messaging diagram illustrating an exemplary messaging event according to an embodiment of the invention.

The signalling chart of FIG. 6 illustrates the required signalling. In the example of FIG. 6, a network apparatus such as a packet data gateway 501, determines 602 whether a traffic flow 601 has been properly classified by a deep packet inspection virtual machine. If the traffic flow 601 has been properly classified by the deep packet inspection virtual machine, the packet data gateway 501 instructs 603 a software defined networking controller 502 to stop sending further packets of said traffic flow to the deep packet inspection virtual machine. In item 604, the software defined networking controller 502, based on said instructing, disables the DPI service for said traffic flow. In item 605, the packet data gateway 501 monitors/determines whether a change happens in the traffic flow. If there is a change in the traffic flow, the packet data gateway 501 instructs the software defined networking controller 502 to start sending packets to the deep packet inspection virtual machine again. In item 607, the software defined networking controller 502, based on said instructing, enables the DPI service for said traffic flow.

The steps/points, signalling messages and related functions de-scribed above in FIGS. 1 to 6 are in no absolute chronological order, and some of the steps/points may be performed simultaneously or in an order differing from the given one. Other functions can also be executed between the steps/points or within the steps/points and other signalling messages sent be-tween the illustrated messages. Some of the steps/points or part of the steps/points can also be left out or replaced by a corresponding step/point or part of the step/point. The apparatus operations illustrate a procedure that may be implemented in one or more physical or logical entities. The signalling messages are only exemplary and may even comprise several separate messages for transmitting the same information. In addition, the messages may also contain other information.

It will be obvious to a person skilled in the art that, as the technology advances, the inventive concept can be implemented in various ways. The invention and its embodiments are not limited to the examples described above but may vary within the scope of the claims.

List of Abbreviations

SDN software defined network
PGW packet data gateway
DPI deep packet inspection
VM virtual machine
HTTP hypertext transfer protocol
NFV network function virtualization
TCP transfer control protocol
AAA authentication, authorisation and accounting
SDK software development kit

The invention claimed is:

1. A method for service offloading in a communications system, comprising:
   determining, in a network apparatus, whether a traffic flow has been properly classified by a deep packet inspection virtual machine;
   keeping track of a content length of a resource being transferred to a client; and
   when transferring of each data packet of the traffic flow is completed, disabling offloading the deep packet inspection virtual machine, wherein subsequent data packets of said traffic flow are sent to the deep packet inspection virtual machine through a software defined networking switch,
   wherein if the traffic flow has been properly classified by the deep packet inspection virtual machine, the method comprises instructing a software defined networking controller to stop sending further packets of said traffic flow to the deep packet inspection virtual machine.

2. A method according to claim 1, further comprising:
   determining whether there is a change in the traffic flow;
   wherein if there is a change in the traffic flow, the method comprises instructing the software defined networking controller to start sending packets to the deep packet inspection virtual machine again.

3. A method according to claim 2, wherein
   the change in the traffic flow comprises a change of URI or host name or some other change that changes the classification of the traffic flow.

4. A method according to claim 1, wherein
   the classification of the traffic flow defines whether the traffic flow belongs to a particular web service and/or web application.

5. A method according to claim 1, further comprising:
   performing classification of the traffic flow based on a first few packets of the traffic flow.

6. A method according to claim 1, further comprising:
   performing classification of the traffic flow by
      forwarding the traffic flow to the deep packet inspection virtual machine by programming a software defined networking switch, wherein the data packets are returned back along with a custom header specifying a classification result.

7. An apparatus comprising at least one processor; and at least one memory including a computer program code, wherein the at least one memory and the computer program code are configured to, with the at least one processor, cause the apparatus to perform the method steps of claim 1.

8. A computer program product embodied on a non-transitory computer-readable medium, said product comprising executable code that when executed, causes execution of functions of a method according to claim 1.

9. A method for service offloading in a communications system, comprising:
- determining, in a network apparatus, whether a traffic flow has been properly classified by a deep packet inspection virtual machine;
- performing classification of the traffic flow by
  - forwarding the traffic flow to the deep packet inspection virtual machine by programming a software defined networking switch, wherein the data packets are returned back along with a custom header specifying a classification result,
- wherein if the traffic flow has been properly classified by the deep packet inspection virtual machine, the method comprises instructing a software defined networking controller to stop sending further packets of said traffic flow to the deep packet inspection virtual machine, and
- wherein if a classification field includes a valid application, a service chain to the deep packet inspection virtual machine is interrupted from a software defined networking switch and the classification result is used for subsequent packets of said traffic flow.

10. An apparatus comprising at least one processor; and at least one memory including a computer program code, wherein the at least one memory and the computer program code are configured to, with the at least one processor, cause the apparatus to
- disable a deep packet inspection service for a traffic flow, based on instructions received from a packet data gateway, if said instructions instruct the apparatus to stop sending further packets of said traffic flow to a deep packet inspection virtual machine;
- enable the deep packet inspection service for the traffic flow, based on the instructions received from the packet data gateway, if said instructions instruct the apparatus to start sending further packets of said traffic flow to the deep packet inspection virtual machine;
- keep track of a content length of a resource being transferred to a client; and
- when transferring of each data packet of the traffic flow is completed, disable offloading the deep packet inspection virtual machine, wherein subsequent data packets of said traffic flow are sent to the deep packet inspection virtual machine through a software defined networking switch.

* * * * *